Patented Jan. 22, 1935

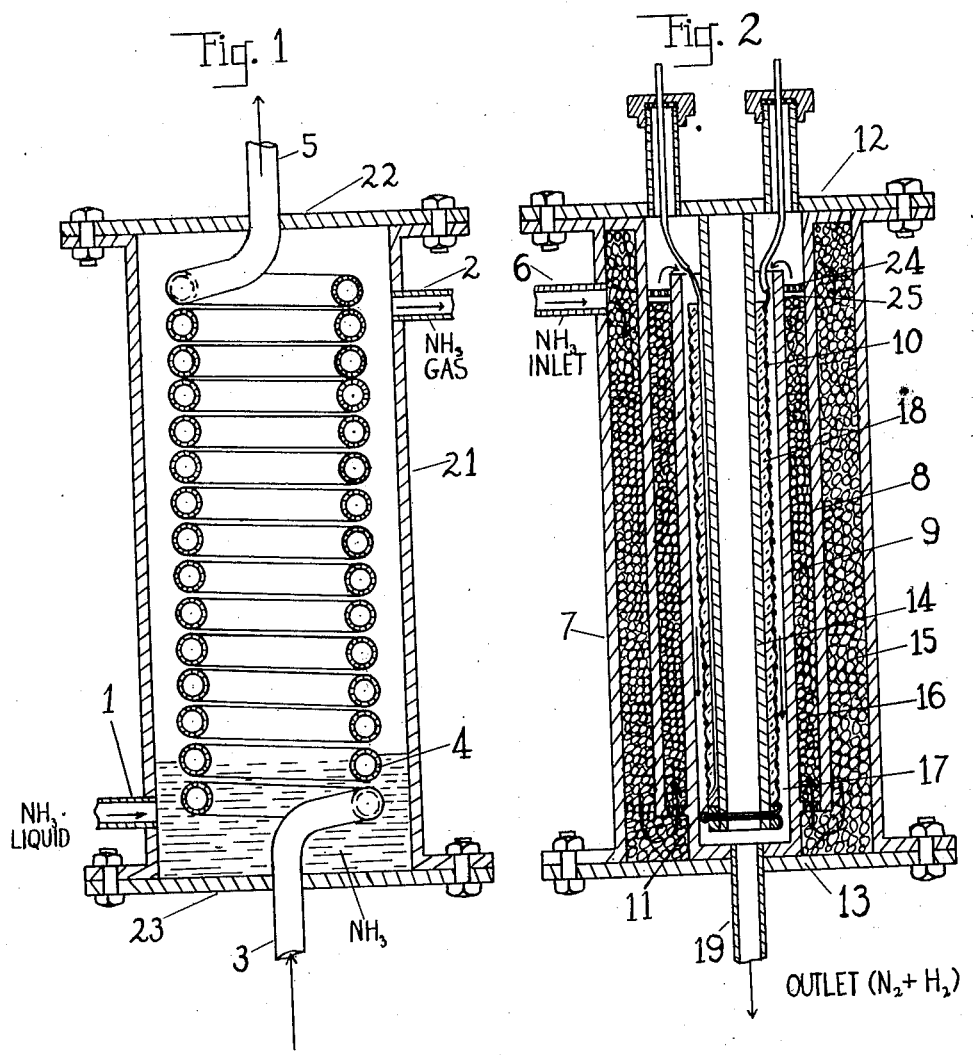

1,988,781

UNITED STATES PATENT OFFICE 1,988,781

PROCESS FOR PREPARING A MIXTURE OF NITROGEN AND HYDROGEN

George W. Burke, Westfield, N. J., assignor to E. I. du Pont de Nemours & Company, Wilmington, Del., a corporation of Delaware Original application August 1, 1930, Serial No. 472,328. Patent No. 1,915,120. Divided and this application July 15, 1932, Serial No. 622,613

6 Claims. (Cl. 23—7)

This invention relates to the manufacture of gaseous mixtures of hydrogen and nitrogen by the thermal decomposition or cracking of ammonia.

It has only recently been appreciated that the wide application of the direct synthesis to the manufacture of ammonia has rendered that matrial so generally available at moderate prices as to make it, for many purposes, a very convenient and economical source of hydrogen, nitrogen, or mixtures of these gases. Ammonia can readily be decomposed into hydrogen and nitrogen by passage in the gaseous state and at an elevated temperature over a suitable catalyst. Research directed to the commercial development of this method of gas generation has shown important difficulties rising primarily from the need for a thermally more efficient method and an inexpensive, compact, and portable equipment which can be employed economically for cracking ammonia.

It is accordingly an object of the invention to provide an improved process for the thermal decomposition or cracking of ammonia characterized by an increased thermal efficiency and smoothness of operation.

It is a further object of the invention to provide an improved method for volatilizing the ammonia which is to be cracked.

An additional object of the invention is to provide an improved form of cracking apparatus which is disclosed and claimed in my copending application Ser. No. 472,328, filed August 1, 1930, Pat. #1,915,120 issued June 20, 1933 of which the present application is a division.

These and other objects of the invention will be more fully understood by reference to the following specification, in which the preferred embodiments are described, and to the accompanying drawing, in which—

Figure 1 is a sectional view of an apparatus for producing ammonia gas from liquid ammonia, the apparatus comprising a casing 21, provided with cover plates 22 and 23, liquid ammonia inlet 1 and gaseous ammonia outlet 2, and enclosing a heating coil 4, by means of which liquid ammonia is volatilized and preheated at the expense of the heat in the gaseous products of the decomposition; and Figure 2 is a view, also in section, of the cracker, consisting of a casing 7, with cover plates 12 and 13 and enclosing tubular members 8, 9, and 14, so disposed as to form annular catalyst receptacles 15 and 16 and a heating chamber 17.

Referring to Figure 1, in operating the apparatus, liquid ammonia, conveniently derived directly from an ordinary cylinder of commercial ammonia, is delivered under its own pressure to the inlet 1. The hot products of the decomposition, effected in the cracker of Figure 2, in traversing the coil 4 volatilize the liquid ammonia and preheat the resultant gas, which leaves via the outlet 2 and enters the cracker by the inlet 6. Entering the annular space 15 the ammonia contacts with catalyst therein, and the gas being further heated by thermal exchange with previous portions of gas in the passage 16, cracking is initiated almost at once and is continued and completed in the second catalyst space 16. Here the gases flow in the opposite direction and in heat exchange with the gases in the passage 17. Leaving 16, via the orifices in the ring 24, which rests on rods 25, the gases again reverse the direction of flow to pass through the passage 17 where they contact with the electrical heating coil 10, wound upon the alundum tube 18 which is supported by the tubular member 14. The hot decomposition products leave the cracker by the outlet 19 whence they are delivered to the inlet 3 of the coil 4 of the vaporizer, Figure 1, from which they are withdrawn thru outlet 5.

The catalyst employed in the apparatus may be any catalyst active for the decomposition of ammonia. This may consist of granular iron, obtained, for example, by the reduction of fused iron oxide, to which promoters, such as aluminum oxide, magnesium oxide, zirconium oxide, etc., may advantageously be added. A particularly suitable catalyst may be made by mixing 3% by weight of magnesium oxide and 3% by weight of aluminum oxide to pure ferroso ferrous oxide. Melt the mixture, cool, crush to 8–14 mesh size, and reduce with hydrogen at a temperature within the range of 300–350° C. In selecting the raw materials and in preparing the catalyst care should be taken to avoid contamination by sulphur compounds as well as other catalyst poisons.

While the invention is not limited to the use of any specific temperature and the temperature best for the purpose will vary with the particular catalyst employed, it may be stated that with the catalyst above described very satisfactory results are obtained when the latter is maintained at a temperature of about 550–650° C. More specifically, it is preferable that the temperature of the hottest part of the catalyst, which will be from one-half to two-thirds the way up the passage 16, should be about 600°. With an apparatus of the character described and shown in the drawing, the casing 7 being a standard six inch wrought iron pipe, 14½ inches long, and the members 8, 9, and 14, being 4, 2½, and 1 inch wrought iron pipe respectively, and with a 2100–2200 watt nichrome heating element, 150 cu. ft. of hydrogen-nitrogen mixture were obtained per hour when the ammonia inlet flow was adjusted so that the gases leaving 19 were substantially free from ammonia.

Employing the procedure and apparatus described the heat exchange between the gases in the cracker produces a relatively uniform temperature and hence a more efficient operation. The gases admitted to the space 15 are rapidly brought to reaction temperature by thermal exchange with the gases in space 16. As a consequence in an apparatus of this kind I have succeeded in obtaining substantially 90% decomposition of the ammonia in the space 15, the remaining 10% being then readily effected in space 16. The centrally disposed heating coil 10, being subjected to contact only with ammonia-free gases is not corroded as would otherwise be the case and being insulated by the gases in the surrounding annular catalyst chambers, operates efficiently and economically.

It will also be observed that by utilizing the heat in the gaseous products to volatilize the ammonia that is to be decomposed the over-all thermal efficiency of the process is greatly improved, and the apparatus considerably simplified. Otherwise a separate source of heat would be required. By the present arrangement the sensible and otherwise waste heat of the products is used to volatilize the liquid ammonia and preheat the resultant gas, the introduction of this preliminarily warmed gas to the catalyst making possible a more efficient utilization of the latter. The arrangement also contributes to smoothness and uniformity of operation by correcting for slight variations in temperature due to extraneous causes. Thus, in the event of a temporary rise in temperature of the decomposition chamber the rate of volatilization of ammonia will automatically increase and the larger quantity of ammonia delivered through inlet 6 will tend to retard the endothermic decomposition reaction. Similarly a momentary drop in temperature will automatically be corrected by a decrease in the rate of delivery of ammonia to the cracker.

In practice it is desirable to provide insulation, not shown, upon the casings 21 and 7 as well as the connecting pipes carrying hot gases. Valves, also not shown, are employed for regulating the delivery of the fluids to and from the apparatus.

It will be apparent that the method and apparatus hereinbefore described is well adapted for the efficient cracking of ammonia on a large or small scale and the apparatus, being readily constructed in a compact and portable form, is especially suited for industrial uses, such as welding operations, for example, where hydrogen-containing gases are required more or less intermittently and in fluctuating quantities at different locations.

Various changes may be made in the method and apparatus described without departing from the invention or sacrificing any of the advantages thereof.

I claim:

1. Process for producing a mixture of nitrogen and hydrogen which comprises heating ammonia substantially to cracking temperature, contacting the heated ammonia with an ammonia cracking catalyst, conveying the cracked ammonia simultaneously in contact with a heating element and in heat exchange relation but not in actual contact with the cracking catalyst, and thereafter regulating the smoothness and uniformity of the reaction by conveying the cracked ammonia in heat exchange relation but not in actual contact with fresh liquid anhydrous ammonia, before delivery thereof to the cracking catalyst.

2. Process for producing a mixture of nitrogen and hydrogen which comprises vaporizing liquid anhydrous ammonia, cracking the resultant gaseous ammonia while supplying heat thereto in the presence of an ammonia cracking catalyst, and regulating the smoothness and uniformity of the reaction by utilizing the heat in the gaseous products to vaporize subsequent portions of liquid ammonia.

3. Process for producing a mixture of nitrogen and hydrogen which comprises vaporizing liquid anhydrous ammonia, cracking the resultant gaseous ammonia while supplying heat thereto, in the presence of an ammonia cracking catalyst, and thereafter regulating the smoothness and uniformity of the reaction by conveying the hot gaseous products in heat exchange relation first with vaporized ammonia undergoing decomposition, and then with liquid ammonia to be cracked.

4. Process as in claim 1 in which liquid anhydrous ammonia is volatilized by passage of the hot gaseous products of the process in heat exchange relation therewith.

5. In a process for producing a mixture of nitrogen and hydrogen by cracking ammonia, the step which comprises regulating the smoothness and uniformity of operation by utilizing the heat in the gaseous products to vaporize subsequent portions of liquid anhydrous ammonia.

6. In a process for producing a mixture of nitrogen and hydrogen by cracking ammonia, the step which comprises regulating the smoothness and uniformity of operation by utilizing the heat in the cracked ammonia gases to vaporize, in proportion to their heat content, subsequent portions of liquid anhydrous ammonia.

GEORGE W. BURKE.